United States Patent
Van Rensburg et al.

(10) Patent No.: US 7,536,205 B2
(45) Date of Patent: May 19, 2009

(54) APPARATUS AND METHOD FOR DOWNLINK SPATIAL DIVISION MULTIPLE ACCESS SCHEDULING IN A WIRELESS NETWORK

(75) Inventors: Cornelius Van Rensburg, Dallas, TX (US); Jiann-An Tsai, Richardson, TX (US); Lai King Tee, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 705 days.

(21) Appl. No.: 11/128,772

(22) Filed: May 13, 2005

(65) Prior Publication Data
US 2005/0277444 A1   Dec. 15, 2005

Related U.S. Application Data

(60) Provisional application No. 60/579,897, filed on Jun. 15, 2004.

(51) Int. Cl.
*H04M 1/00* (2006.01)

(52) U.S. Cl. .................. 455/562.1; 455/552.1; 370/334

(58) Field of Classification Search ............. 455/550.1, 455/552.1, 561, 562.1; 370/328, 329, 330, 370/334
See application file for complete search history.

(56) References Cited

U.S. PATENT DOCUMENTS

| 6,870,808 B1 * | 3/2005 | Liu et al. ..................... 370/203 |
| 2003/0017830 A1 * | 1/2003 | Kayama et al. ............. 455/450 |
| 2003/0128658 A1 * | 7/2003 | Walton et al. ............... 370/208 |

* cited by examiner

*Primary Examiner*—Nhan T Le

(57) ABSTRACT

A base station for communicating with mobile stations in a coverage area of the wireless network. The base station comprises: 1) a transceiver for transmitting downlink OFDMA signals to each mobile station; 2) an antenna array for transmitting the downlink OFDMA signals to the mobile stations using spatially directed beams; and 3) an SDMA scheduling controller for scheduling downlink transmissions to the mobile stations. The SDMA scheduling controller determines a first mobile station having a highest priority and schedules the first mobile station for downlink transmission in a particular time-frequency slot. The SDMA scheduling controller then determines additional mobile stations that are spatially uncorrelated with the first mobile station, as well as each other, and schedules the additional mobile stations for downlink transmission in that particular time-frequency slot according to priority.

20 Claims, 4 Drawing Sheets

APPARATUS AND METHOD FOR DOWNLINK SPATIAL DIVISION MULTIPLE ACCESS SCHEDULING IN A WIRELESS NETWORK

CROSS-REFERENCE TO RELATED APPLICATION AND CLAIM OF PRIORITY

The present invention is related to that disclosed in U.S. Provisional Patent No. 60/579,897, filed Jun. 15, 2004, entitled "Downlink SDMA Scheduling For OFDMA Systems". U.S. Provisional Patent No. 60/579,897 is assigned to the assignee of the present application. The subject matter disclosed in U.S. Provisional Patent No. 60/579,897 is hereby incorporated by reference into the present disclosure as if fully set forth herein. The present application hereby claims priority under 35 U.S.C. §119(e) to U.S. Provisional Patent No. 60/579,897.

TECHNICAL FIELD OF THE INVENTION

The present invention relates generally to wireless network and, more specifically, to a mechanism for scheduling SDMA forward channel (downlink) transmissions in an OFDMA wireless network.

BACKGROUND OF THE INVENTION

The throughput of the forward channel (or downlink) of a wireless network is significantly affected by the scheduling algorithm employed by the base stations of the wireless network. A large number of algorithms have been developed for scheduling the transmissions of voice and data traffic from the base stations to the mobile stations (e.g., cell phones, wireless PCs, etc.). These scheduling algorithms generally allocate to each mobile station a time slot, a frequency assignment, or a code (e.g., Walsh code), or a combination of these elements, for receiving traffic in the forward channel.

For example, a conventional orthogonal frequency division multiple access (OFDMA) network uses a scheduling algorithm that assigns each mobile station to receive forward channel (downlink) traffic in a particular timeslot and using a particular frequency assignment. This scheduling algorithm may be represented by a two-dimensional array that has timeslots on one axis (e.g., x-axis) and frequency assignments on a second axis (e.g., y-axis). Most conventional wireless networks, including conventional OFDMA networks, use a single antenna that transmits all data in a 360 degree sweep around the base station or use a sector antenna that transmits all data in, for example, a 90 degree sector or a 120 degree sector of a base station. For these types of antennas, conventional scheduling algorithms that may be represented by the two-dimensional array describe above are sufficient.

However, the new generation of wireless networks implement multiple antennas (i.e., antenna arrays) that are capable of using beamforming to transmit to mobile stations in the forward channel. Thus, even within the same antenna sector, it is possible to transmit to two separate mobile stations using the same frequency assignment and time slot, provided the two mobile stations have a sufficient spatial separation such that different transmit beams may be used. Thus, the scheduling algorithm goes from being a two-dimensional array to being a three dimensional array in which timeslots are on one axis (e.g., x-axis), frequency assignments are on a second axis (e.g., y-axis), and space (or transmit beam) is on a third axis (e.g., z-axis).

Some of the existing literature on scheduling for wireless communication and cross-layer optimizations are summarized in review papers such as "Dynamic Slot Allocation (DSA) In Indoor SDMA/TDMA Using A Smart Antenna Base Station," F. Shad et al., IEEE/ACM Transactions on Networking, Volume 9, Issue 1, February 2001, and "Performance Of Space-Division Multiple-Access (SDMA) With Scheduling," H. Yin et al., IEEE Transactions on Wireless Communications, Volume 1, Issue 4, October 2002. Recently, some interesting work has appeared on the cross-layer scheduling problem specifically for SDMA applications. Some of the research addressed the downlink in OFDM/A systems, such as "System Level Performance Evaluation Of OFDMA Forward Link With Proportional Fair Scheduling," S. Yoon et al., Wireless World Research Forum, China, February 2004. Other research addressed the downlink, such as "Data Throughput Of CDMA-HDR—A High Efficiency Data Rate Personal Communication Wireless System," R. P. Jalali et al., IEEE Vehicular Technology Conference VTC2000—Fall 2000 and "Element of Information Theory," T. M. Cover et al., Wiley, 1991. The Yoon and Jalali references cited above describe single antenna proportional fair schedulers.

Also, some SDMA papers for CDMA wireless networks have been presented. These papers include: 1) "An Overview Of Scheduling Algorithms In Wireless Multimedia Networks," H. Fattah et al., Wireless Communications, IEEE [see also IEEE Personal Communications], Volume 9, Issue 5, October 2002; 2) "Scheduling Algorithms In Broadband Wireless Networks," Y. Cao et al., Proceedings of the IEEE, Volume 89, Issue 1, January 2001; and 3) "A Combined OFDM/SDMA Approach," P. Vandenameele et al., IEEE Journal on Selected Areas in Communications, Volume 18, Issue 11, November 2000.

In "A Simplified Opportunistic Feedback And Scheduling Scheme For OFDM," P. Svedman, IEEE Vehicular Technology Conference VTC2004—Spring 2004, it is demonstrated that optimal slot allocation in a downlink TDMA/SDMA system based on SINR feedback from the mobile station (MS) is an NP-complete problem. This is because the spatial signatures of the different mobile stations are rarely orthogonal. This paper also showed that it is possible to achieve up to two times capacity improvement compared to random slot allocation methods.

Similarly, the paper "Attaining Both Coverage And High Spectral Efficiency With Adaptive OFDM Downlinks," A. M. Sternad et al., IEEE Vehicular Technology Conference VTC2003—Fall, Orlando, Fla., October 2003 addresses the problem of cross-layer optimization, where physical layer spatial channel information is used to do SDMA MAC layer scheduling. The solution presented is somewhat simplified, since it assumes a fixed data rate per mobile station. Therefore, the discussion does not need to consider adaptive modulation. This means that there exists an optimum SINR per mobile station. This paper does a best-fit search to allocate SDMA users so that each user achieves an optimum SINR.

The Fatah reference cited above (i.e., "An Overview Of Scheduling Algorithms In Wireless Multimedia Networks") discusses an HSDPA application with beamforming. The Fatah references shows that the maximum SIR method with beamforming (also known as the maximum throughput method, which exclusively serves the user with the best channel conditions and thereby starves the weaker users) does not improve the throughput significantly since self-interference is dominant. It also creates widely fluctuating inter-cell interference. The Fatah reference demonstrates that an SDMA method has double the throughput compared to the maximum SIR method with beamforming.

The Cao reference cited above (i.e., "Scheduling Algorithms In Broadband Wireless Networks") considered the downlink CDMA2000 packet data channel (PDCH) scheduling problem using multi beam-phase sweep transmit diversity (PSTD). The Cao reference compared the optimal scheduling algorithm with a simplified greedy algorithm and also the more novel genetic algorithm. The Cao reference discloses that the so-called "greedy" algorithm is optimal for one antenna, but is sub-optimal for multiple antennas. The genetic algorithm is attractive because it offers close to optimal performance at a computational complexity saving of 1000 times relative to the optimal algorithm.

In "Directed Maximum Ratio Combining And Scheduling Of High-Rate Transmission For Data Networks", J. Wu et al., U.S. Patent Pub. No. 2003/0016731 A1, Metawave, Jan. 23, 2003, a downlink scheduler is proposed for a CDMA2000 system. The idea is to use the correlation of spatial signatures of different mobiles as a measure to cluster mobiles. The different orthogonal clusters can then all use the same Walsh codes.

In the Sternad reference cite above (i.e., "Attaining Both Coverage and High Spectral Efficiency with Adaptive OFDM Downlinks"), the authors introduced "coordinated scheduling" between sectors of the same OFDMA cell in order to achieve an efficiency of 2.1 bps/Hz/sector for thirty (30) mobile stations. The authors proposed to increase the frequency utilization by dividing the frequency spectrum in two, reserving one group of sub-carriers to the inner cell (close to base station) and the rest to the sector edge. The inner frequency channels (sub-channels) are reused in all sectors, while the outer frequency sub-channels are allocated to every 3rd sector.

Additional references discussing schedulers include: 1) "Combined Beamforming And Scheduling For High Speed Downlink Packet Access," A. Seeger, Proceedings of Globecom, 2003; 2) "On Generalized Optimal Scheduling Of High Data-Rate Bursts In CDMA Systems," V. Lau et al., IEEE Transactions on Communications, Volume 51, Issue 2, February 2003; and 3) "Directed Maximum Ratio Combining And Scheduling Of High Rate Transmission For Data Networks," J. Wu et al., U.S. Patent Pub. No. US 2003/0016731 A1, Metawave, Jan. 23, 2003.

The prior art scheduling algorithms discussed above consist of schedulers for several variations of spatial division multiple access (SDMA), time division multiple access (TDMA), orthogonal frequency division multiplexing (OFDM), and code division multiple access (CDMA). However, none of the conventional algorithms is suitable for an OFDMA wireless network that uses beamforming in the forward channel (downlink) to perform SDMA transmission. Therefore, there is a need in the art for an improved scheduler for use in OFDMA-SDMA wireless network.

SUMMARY OF THE INVENTION

The present invention proposes a scheduler for use in the forward channel (i.e., downlink) of an orthogonal frequency division multiple access (OFDMA) wireless network that is enabled for spatial division multiple access (SDMA). The proposed WiBro system and IEEE-802.16d/e systems are capable of being SDMA-enabled OFDMA wireless networks.

To address the above-discussed deficiencies of the prior art, it is a primary object of the present invention to provide, for use in wireless network, a base station capable of communicating with a plurality of mobile stations in a coverage area of the wireless network. According to an advantageous embodiment of the present invention, the base station comprises: 1) a transceiver capable of transmitting downlink orthogonal frequency division multiple access (OFDMA) signals to each of the plurality of mobile stations; 2) an antenna array comprising a plurality of antenna elements capable of transmitting the downlink OFDMA signals to each of the plurality of mobile stations using spatially directed beams; and 3) a spatial division multiple access (SDMA) scheduling controller capable of scheduling downlink transmissions to the plurality of mobile stations.

According to one embodiment of the present invention, the SDMA scheduling controller is capable of determining a first mobile station in the plurality of mobile stations having a highest priority.

According to another embodiment of the present invention, the SDMA scheduling controller is further capable of scheduling the first mobile station for downlink transmission in a first time-frequency slot.

According to still another embodiment of the present invention, the SDMA scheduling controller is further capable of determining from the plurality of mobile stations a first set of mobile stations that are spatially uncorrelated with the first mobile station.

According to yet another embodiment of the present invention, the SDMA scheduling controller is capable of determining a second mobile station in the first set of mobile stations having a highest priority in the first set of mobile stations.

According to a further embodiment of the present invention, the SDMA scheduling controller is further capable of scheduling the second mobile station for downlink transmission in the first time-frequency slot.

According to a still further embodiment of the present invention, the SDMA scheduling controller is further capable of determining from the first set of mobile stations a second set of mobile stations that are spatially uncorrelated with the second mobile station.

According to a yet further embodiment of the present invention, the SDMA scheduling controller is capable of determining a third mobile station in the second set of mobile stations having a highest priority in the second set of mobile stations.

In one embodiment of the present invention, the SDMA scheduling controller is further capable of scheduling the third mobile station for downlink transmission in the first time-frequency slot.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged SDMA-OFDMA wireless network.

Figure 1:
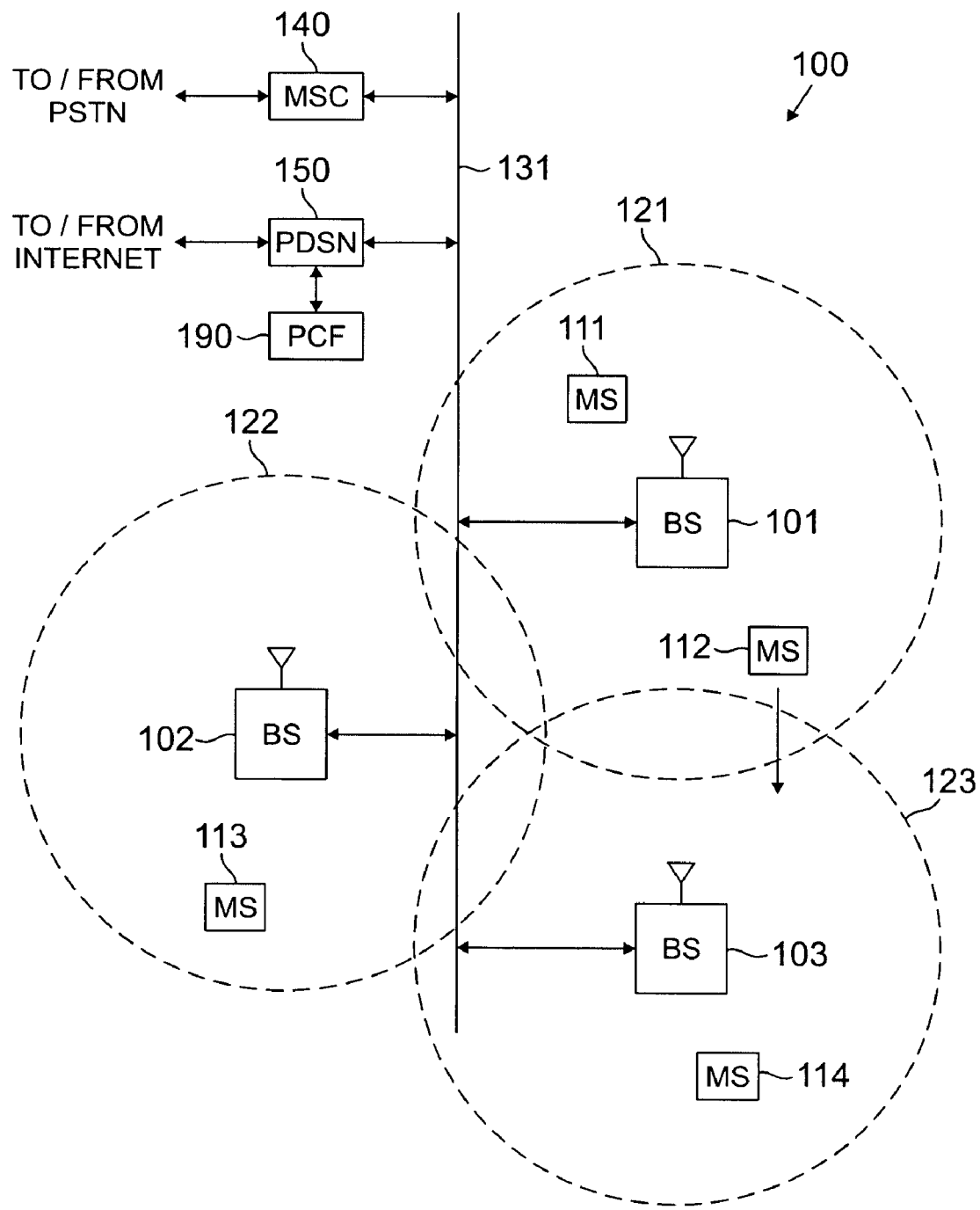
FIG. 1 illustrates an exemplary wireless network that implements a downlink scheduler according to the principles of the present invention.

FIG. 1 illustrates exemplary wireless network 100, which implements a downlink scheduler according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over orthogonal frequency division multiple access (OFDMA) channels according to, for example, the IEEE-802.16d/e standard or the proposed WiBro standard. In an advantageous embodiment of the present invention, mobile stations 111-114 are capable of receiving data traffic and/or voice traffic on two or more channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any one particular cell site configuration. According to an exemplary embodiment of the present invention, each one of base stations 101-103 comprises an antenna array that uses well-known beamforming techniques to implement spatial division multiple access (SDMA) over the OFDMA channels.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Figure 2:
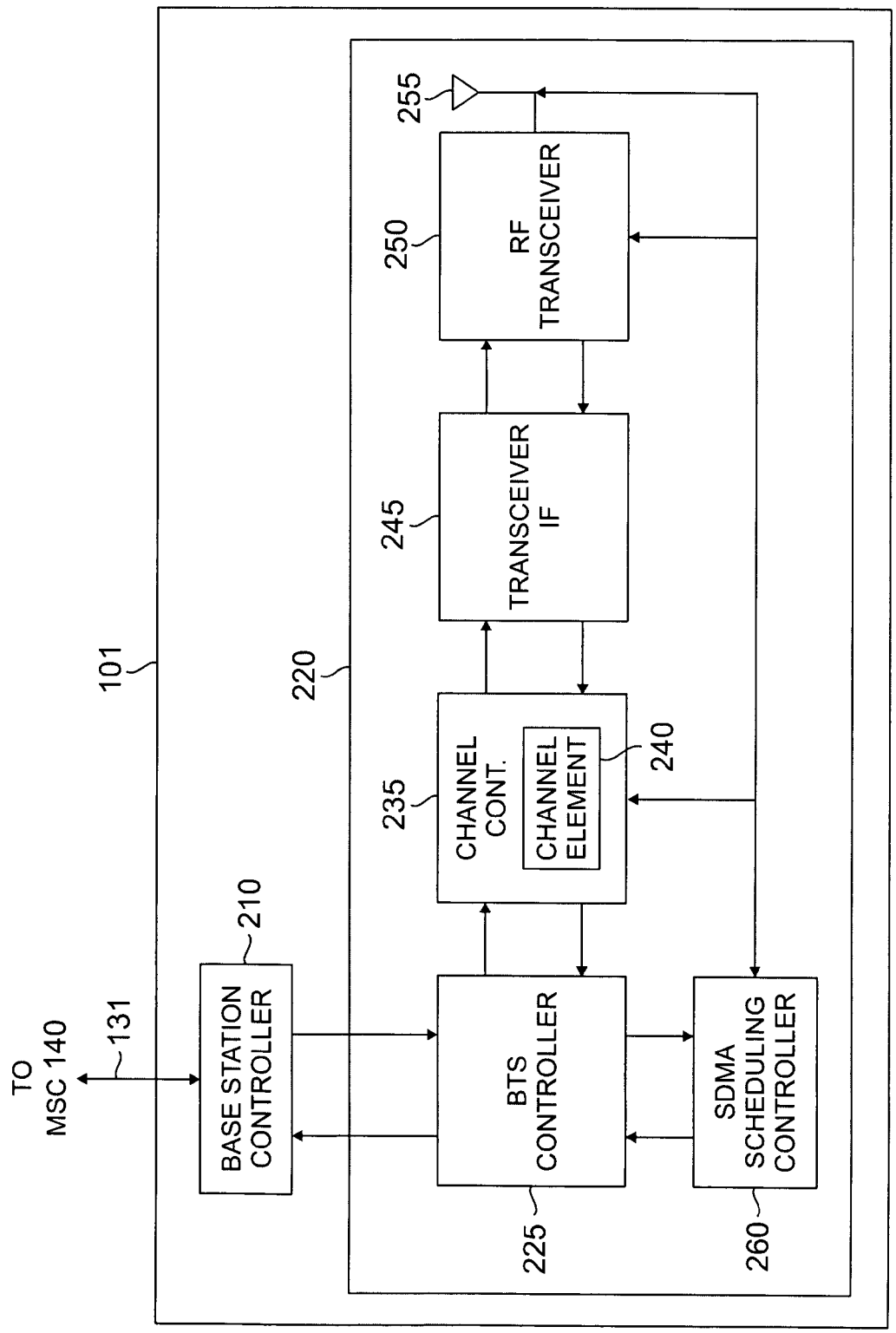
FIG. 2 illustrates in greater detail an exemplary base station that implements an SDMA-OFDMA scheduling algorithm according to the principles of the present invention.

FIG. 2 illustrates in greater detail exemplary base station 101, which implements SDMA-OFDMA scheduling according to the principles of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, channel controller 235 (which contains representative channel element 240), transceiver interface (IF) 245, RF transceiver 250, antenna array 255, and spatial division multiple access (SDMA) scheduling controller 260.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A forward channel (or downlink) refers to outbound signals from the base station to the mobile station and a reverse channel (or uplink) refers to inbound signals from the mobile station to the base station. Transceiver IF 245 transfers the bi-directional channel signals between channel controller 240 and RF transceiver 250.

Antenna array 255 transmits forward channel signals received from RF transceiver 250 to mobile stations in the coverage area of BS 101. Antenna array 255 also sends to RF transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during both transmit and receive operations. Moreover, according to an advantageous embodiment of the present invention, each sector of antenna array 255 comprises multiple antenna elements that enable antenna array 255 to use well-known beamforming techniques to implement spatial division multiple access (SDMA) over the OFDMA channels.

According to the principles of the present invention, SDMA scheduling controller 260 implements an improved scheduling algorithm for the SDMA-OFDMA channels of base station 101. SDMA scheduling controller 260 controls the timing of the transmissions of the channel elements 240 in channel controller 235. SDMA scheduling controller 250 also communicates with RF transceiver 250 and antenna array 255 to control the beamforming of transmissions in the forward channels (downlink) of base station 101. In the exemplary embodiment of the present invention, SDMA scheduling controller 250 is shown as a separate controller from BTS controller 225. However, in an alternate embodiment of the present invention, SDMA scheduling controller 250 may be implemented in software as a function of BTS controller 225.

Figure 3:
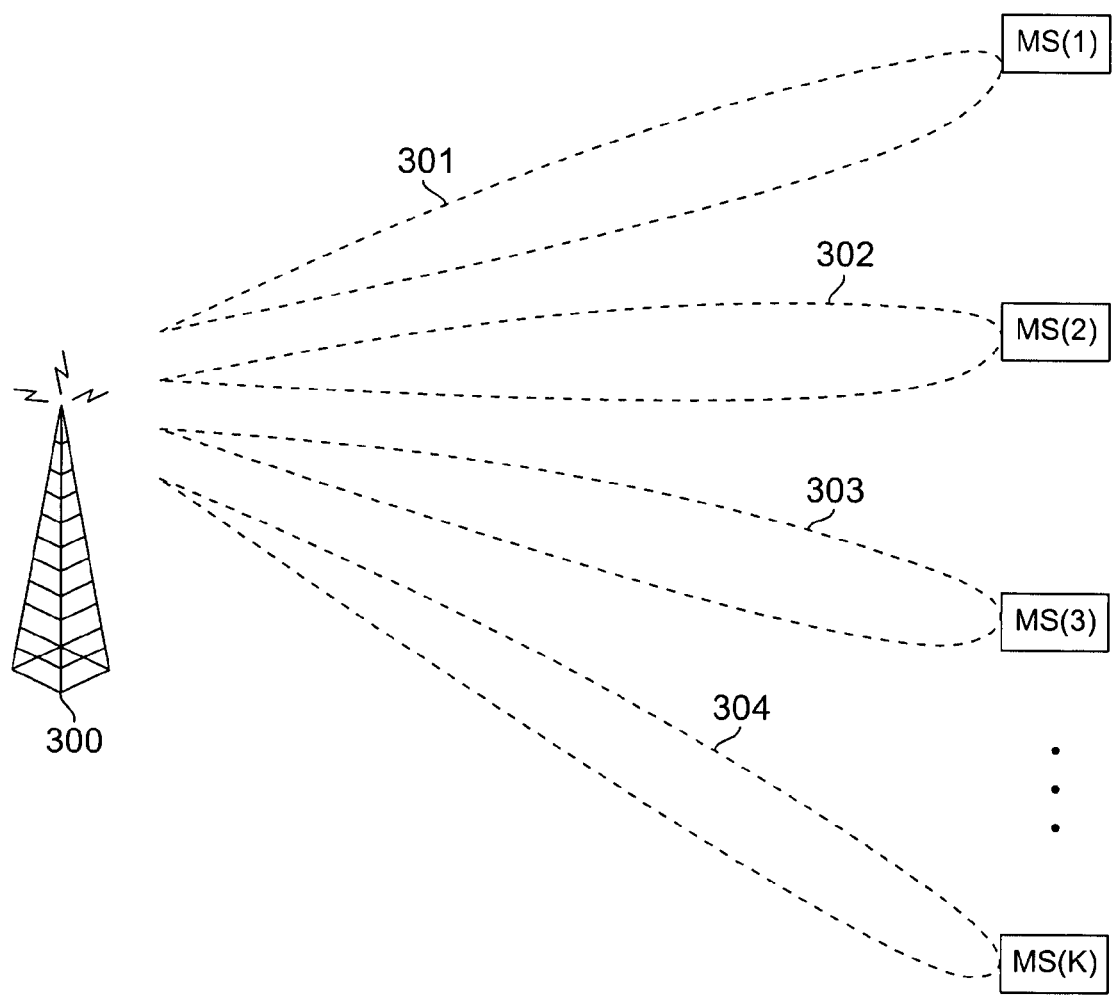
FIG. 3 illustrates the transmission of forward channel traffic using beamforming techniques according to an exemplary embodiment of the present invention.

FIG. 3 illustrates transmission of forward channel traffic using beamforming techniques according to an exemplary embodiment of the present invention. Base station 300 transmits a plurality of spatially directed forward channel beams to K mobile stations, including representative mobile stations MS(1), MS(2), MS(3) and MS(K). Base station 300 represents any of base stations 101-103 in FIG. 1 or any other base station in wireless network 100. MS(1), MS(2), MS(3) and MS(K) represent mobile stations 111-114 in FIG. 1 or any other mobile station accessing wireless network 100.

The spatially directed beams transmitted by base station 300 include beams 301-304. Beam 301 is the spatially directed beam that transmits forward channel (or downlink) voice and data packets to MS(1). Beam 302 is the spatially directed beam that transmits forward channel (or downlink) voice and data packets to MS(2). Beam 303 is the spatially directed beam that transmits forward channel (or downlink) voice and data packets to MS(3). Beam 304 is the spatially directed beam that transmits forward channel (or downlink) voice and data packets to MS(K).

The scheduling algorithm executed by SDMA scheduling controller 260 maximizes the data throughput through base station (BS) 300 while maintaining fairness among the K mobile stations served by base station (BS) 300. SDMA scheduling controller 260 increases spectral efficiency by re-using the spectral resources on multiple spatially-separated mobile stations.

In the description that follows, a sub-channel (SC) is an OFDMA time-frequency slot. The carrier-to-interference and noise ratio (CINR) parameter is periodically reported by each mobile station on all sub-channels. Each mobile station measures the CINR parameter based on a pilot signal transmitted by BS 300 on a fixed power for each sub-channel. The signal-to-interference plus noise ratio (SINR) parameter represents the quality of the received data channel at the mobile station. The SINR and CINR parameter are related by the equation:

$$SINR = CINR * AssignedBSPower * BeamformingGain. \quad [\text{Eqn. 1}]$$

Additionally, multi-user diversity gain (MUDG) is a selection diversity gain achieved by allocating resources to the mobile stations that can most efficiently use the resources, based on the channel conditions, as indicated by the CINR in general. The SNR parameter represents the signal-to-noise ratio and the SIR parameter represents the signal-to-interference ratio. In the description that follows, it is assumed that 1) full transmit power is used at all times and 2) BS 300 has a full buffer for all mobile stations.

Base station 300 communicates simultaneously with K mobile stations. In a time-division duplexing (TDD) system, the reverse link spatial channels are identical to the forward link spatial channels and may be estimated by base station 300. The spatial channel (or spatial signature) from BS 300 to the k$^{th}$ mobile station is represented by a column vector, $\underline{a}_k$. Each of the elements in the spatial signature $\underline{a}_k$ is a complex scalar value associated with one of the antenna elements in antenna array 255. For example, if there are four antenna elements, the spatial signature $\underline{a}_k$ for MS(1) is the column vector $[a_{11}\ a_{12}\ a_{13}\ a_{14}]^T$, where $a_{11}$, $a_{12}$, $a_{13}$, and $a_{14}$ are complex scalar values that define the beam that transmits to MS(1). The spatial signature $\underline{a}_k$ is normalized such that the second norm of $a_k$ is one ($\|a_k\|=1$), for all k. Each mobile station reports to BS 300 CINR measurements for each sub-channel based on a pilot signal transmitted at a known and fixed power and over a wide beam.

SDMA scheduling controller 260 is able to transmit to two separate mobile stations in the same time-frequency slot (i.e., the same sub-channel) provided the two mobile stations have spatial signatures that are uncorrelated (i.e., the mobile stations are spatially separated by a minimum distance). Two spatial signatures are uncorrelated if:

$$\|\underline{a}_i^H \underline{a}_k\| \leq \beta, \forall i \neq k. \quad [\text{Eqn. 2}]$$

where β is a predetermined threshold value. The value $\underline{a}_i^H$ is the conjugate Hermitian transpose vector associated with spatial signature $\underline{a}_k$. When Equation 2 is true, the mobile station, MS(i), may re-use the time-frequency slot assigned to MS(k).

In an advantageous embodiment of the present invention, SDMA scheduling controller 260 uses the proportional fair scheduling (PRF) algorithm. SDMA scheduling controller 260 implements a two-step approach to resource allocation. First, SDMA scheduling controller 260 schedules sub-channels to mobile stations. Second, SDMA scheduling controller 260 performs optimal power allocation over the sub-channels.

The algorithm implemented by SDMA scheduling controller 260 maximizes the total base station throughput, while allowing a relative fair sharing of the channel resources. The proportional fair scheduling algorithm is described in the Jalali reference cited above (i.e., "Data Throughput Of CDMA-HDR—A High Efficiency Data Rate Personal Communication Wireless System"). The Jalali reference independently assigned a time slot (in a TDMA system) to a mobile station, MS(k), based on the following maximum priority criteria:

$$MS(k) = \arg_k \max\left[\frac{V(k)}{T(k)^\alpha}\right], \quad \text{[Eqn. 3]}$$

where V(k) is the maximum supportable rate for the $k^{th}$ mobile station during the current slot, T(k) is the average throughput rate of the $k^{th}$ mobile station, and $\alpha$ is a fairness variable between 0 and infinity.

When $\alpha=1$, the scheduling implemented by SDMA scheduling controller 260 is proportional fair. When $\alpha=0$, SDMA scheduling controller 260 is a maximum throughput scheduler. When $\alpha=\infty$, SDMA scheduling controller 260 acts as a round robin scheduler. Furthermore, if the scheduling performed by SDMA scheduling controller 260 is followed by an optimal power allocation across the sub-channels, then the algorithm of the present invention is optimal in maximizing throughput.

Figure 4:
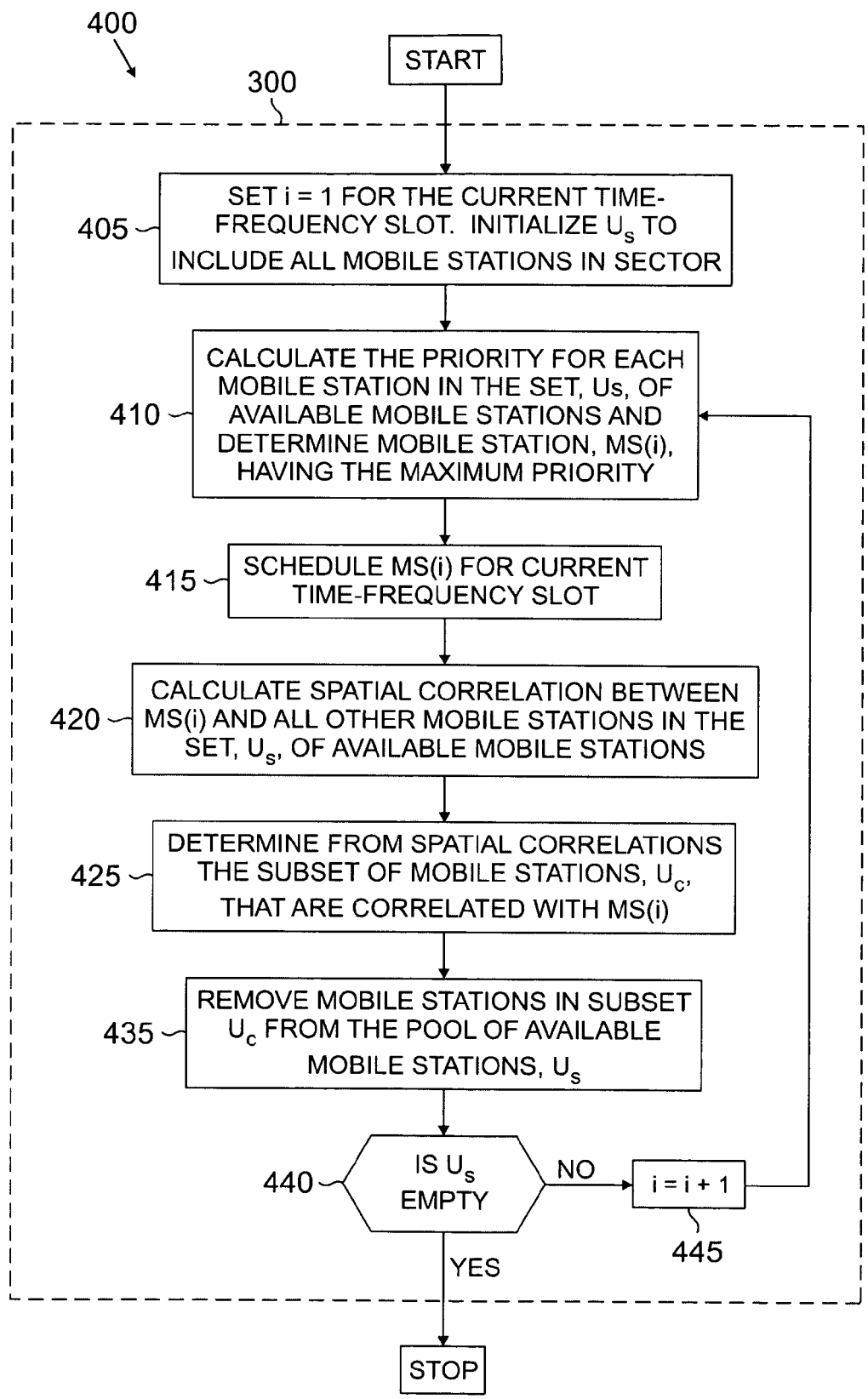
FIG. 4 is a flow diagram illustrating an SDMA-OFDMA scheduling algorithm according to the principles of the present invention.

FIG. 4 depicts flow diagram 400, which illustrates an SDMA-OFDMA scheduling algorithm implemented by SDMA scheduling controller 260 according to the principles of the present invention. The SDMA-OFDMA scheduling algorithm is a direct extension of the single antenna proportional fair scheduler described in the Jalali and Yoon references above. It is assumed that the SDMA-OFDMA scheduling algorithm knows the spatial signatures, namely $\{a_1\ a_2\ a_3 \ldots a_k\}$, for all of the mobile stations in the current sector. This SDMA-OFDMA scheduling algorithm of the present invention is performed continuously for every time-frequency slot of every sector of every cell.

First, SDMA scheduling controller 260 initializes i=1 for the $i^{th}$ mobile station sharing the current sub-channel (i.e., time-frequency slot (process step 405). Next, for the set of all available users (or mobile stations), $U_s=\{u_1\ u_2\ u_3\ \ldots\ u_K\}$, SDMA scheduling controller 260 calculates the priority for each user (or mobile station) in $U_s$ and then determines the maximum priority according to the equation:

$$MS(i) = \arg_i\max\left[\frac{V(\{U_s\})}{T(\{U_s\})^\alpha}\right], \quad \text{[Eqn. 4]}$$

where $f(\{U_s\})$ represents a function applied only to the subset $U_s$ of variables (process step 410). The supportable rate, $V(\{U_s\})$, is calculated based on the SINR for each of the mobile stations in the subset $U_s$. The average rate, $T(\{U_s\})$, is the average throughput experienced by each mobile in the set $U_s$ over a specified past number of frames. In an exemplary embodiment of the present invention, the adaptive modulation and coding (AMC) decisions may be based on SINR and not CINR.

Once the maximum priority mobile station, MS(i), is determined from the current subset of mobile stations, $U_s$, using the proportional fair scheduling algorithm in Equation 4 above, SDMA scheduling controller 260 selects (schedules) MS(i) to receive data in the current time-frequency slot (process steps 415).

Next, SDMA scheduling controller 260 calculates the spatial correlations between the spatial signature of the current scheduled mobile station, MS(i), and each of the spatial signatures of all of the remaining mobile stations in the set $U_s$ (process steps 420). The spatial correlations are calculated according to the equation:

$$[\rho_1 \ldots \rho_K] = \underline{a}_{MS(i)}^H [\underline{a}_1 \underline{a}_2 \ldots \underline{a}_K]. \quad \text{[Eqn. 5]}$$

SDMA scheduling controller 260 then uses Equation 2 to compare each of the correlation vales to a predetermined maximum threshold value, $\beta$, and determines (selects) the subset of users (or mobile stations), $U_c$, that are correlated with (close to) MS(i). Thus, $U_c=|\rho_k|>\beta$, for all k, where $\beta$ is some acceptable threshold, typically $\beta=-10$ dB (process steps 425). Next, SDMA scheduling controller 260 removes the subset $U_c$ from the set of available mobile stations, $U_s$, in the sector (process step 435).

Ideally, SDMA scheduling controller 260 calculates the SINR after beamforming. However, because base station power has not yet been assigned, it is not possible to calculate the post beamforming SINR at the mobile station. However, the correlation is a reasonable predictor for the SINR.

At this point, the next (i=i+1) mobile station must be scheduled to use the current time-frequency slot. SDMA scheduling controller 260 then repeats from process step 410 until either i equals the number of antennas or $U_s$ is an empty set (process steps 440 and 445). At that point, SDMA scheduling controller 260 puts all mobile stations back into the pool of available mobile stations, $U_s$, and re-performs the algorithm for the next time-frequency slot. The algorithm in FIG. 4 is continuously repeated for every update cycle.

An example may be useful in explaining the operation of the algorithm in FIG. 4. Assume that ten mobile stations, MS(1) through MS(10), are available in a sector of base station 300. During a first pass through the algorithm in FIG. 4, SDMA scheduling controller 260 determines that MS(6) has the highest priority and that MS(7), MS(8), MS(9) and MS(10) are uncorrelated with (i.e., far from) MS(6), while MS(1) through MS(5) are correlated with (i.e., close to) MS(6). SDMA scheduling controller 260 then schedules MS(6) in the first time-frequency slot and removes MS(1) through MS(6) from the pool of available mobile stations, $U_s$.

SDMA scheduling controller 260 then performs a second pass through FIG. 4. During the second pass, SDMA scheduling controller 260 determines that MS(7) has the highest priority and that MS(8) and MS(9) are uncorrelated with (i.e., far from) MS(7), while MS(10) is correlated with (i.e., close to) MS(7). SDMA scheduling controller 260 then schedules MS(7) in the first time-frequency slot and removes MS(7) and MS(10) from the pool of available mobile stations, $U_s$.

SDMA scheduling controller 260 then performs a third pass through FIG. 4. During the third pass, SDMA scheduling controller 260 determines that MS(8) has the highest priority and that MS(9) is uncorrelated with (i.e., far from) MS(8).

SDMA scheduling controller 260 then schedules MS(8) and MS(9) in the first time-frequency slot.

At this point, MS(6), MS(7), MS(8), and MS(9) are scheduled to receive during the first time-frequency slot, and MS(1) through MS(5) and MS(10) are not scheduled. SDMA scheduling controller 260 then adds all mobile stations back to the pool of available mobile stations, $U_s$, and then re-performs the algorithm as described above for FIG. 4 for the second time-frequency slot. It is entirely possible that MS(6), MS(7) and MS(8) may again be scheduled to receive during the second time-frequency slot, while MS(1) through MS(5) and MS(10) are again not scheduled. However, at some point, as additional time-frequency slots are scheduled, the calculated priorities of the mobile stations will change and mobile stations that were not scheduled in previous time-frequency slots will attain higher priority and become scheduled.

Given that a system has I sub-channels, a base station may assign a power of $\lambda_i$ watts to the $i^{th}$ sub-channel, such that:

$$\sum_{i=1}^{I} \lambda_i = P, \qquad [\text{Eqn. 6}]$$

where P is the total base station power. According to an advantageous embodiment of the present invention, base station 300 may implement a modified equal power allocation method in which base station assigns an equal power of:

$$\lambda_i = \frac{P}{I}, \qquad [\text{Eqn. 7}]$$

to every sub-channel that satisfies:

$$CINR_i \geq \frac{I}{P} \cdot \gamma, \qquad [\text{Eqn. 8}]$$

and assigns zero power elsewhere. The value, $\gamma$, is the required SINR to support the minimum data rate. For example, if $\gamma=1$ and there is no antenna gain, then the minimum throughput for the $i^{th}$ user would be:

$$V_i = \log_2(1 + \lambda_i CINR_i) = \log_2\left(1 + \frac{P}{I} \cdot \frac{I}{P}\right) = 1 \text{ bps/Hz}. \qquad [\text{Eqn. 9}]$$

This method should cause less interference to neighboring cells than a method that assigns equal power regardless of the CINR.

In an advantageous embodiment of the present invention, base station 300 collects the spatial signatures of all the M scheduled SDMA mobiles for the current time-frequency slot in the matrix A, such that:

$$A=[\underline{a}_1 \underline{a}_2 \underline{a}_3 \ldots \underline{a}_M] \qquad [\text{Eqn. 10}]$$

The present invention introduces two methods for calculating the beam-forming coefficients $[w_1\ w_2\ w_3 \ldots w_M]$, namely the zero-forcing (ZF) method and the minimum mean square error (MMSE) method.

In the ZF beamforming method, the transmit beam coefficients are calculated as:

$$[w_1 \ldots w_M]=A(A^H A)^{-1}, \qquad [\text{Eqn. 11}]$$

where each column is normalized so that $\|w_m\|=1$. The columns of A represent the spatial channels of the SDMA mobile stations interfering with MS(m). It is recalled that mobile stations experience two types of interference, namely: 1) same cell interference due to the base station transmitting to multiple mobile stations on the same sub-channel; and 2) other cell interference from neighboring base stations. Since base station 300 has control only over same cell interference, this is the only interference that BS 300 cancels in the exemplary embodiment. Thus, the M mobile station spatial signatures used in A are all mobile stations in the same cell.

In the MMSE beamforming method, base station 300 calculates the transmit beam coefficients using the following equation:

$$[w_1 \ldots w_M]=AP(PA^H AP+I)^{-1}, \qquad [\text{Eqn. 12}]$$

where each column is again normalized such that $\|w_m\|=1$, and $$P = \begin{bmatrix} \sqrt{CINR_1} & 0 & 0 \\ 0 & \ddots & 0 \\ 0 & 0 & \sqrt{CINR_M} \end{bmatrix} \qquad [\text{Eqn. 13}]$$

Although the present invention has been described with an exemplary embodiment, various changes and modifications may be suggested to one skilled in the art. It is intended that the present invention encompass such changes and modifications as fall within the scope of the appended claims.

What is claimed is:

1. For use in wireless network, a base station capable of communicating with a plurality of mobile stations in a coverage area of said wireless network, said base station comprising:
    a transceiver capable of transmitting downlink orthogonal frequency division multiple access (OFDMA) signals to each of said plurality of mobile stations;
    an antenna array comprising a plurality of antenna elements capable of transmitting said downlink OFDMA signals to said each of said plurality of mobile stations using spatially directed beams; and
    a spatial division multiple access (SDMA) scheduling controller capable of scheduling downlink transmissions to said plurality of mobile stations for a first time-frequency slot by:
        (a) including in an available set of mobile stations all of said plurality of mobile stations;
        (b) scheduling a mobile station having a highest priority in said available set of mobile stations for downlink transmission in said first time-frequency slot; and
        (c) removing from said available set of mobile stations all mobile stations that are spatially correlated with said scheduled mobile station.

2. The base station of claim 1, wherein said SDMA scheduling controller is further capable of:
    calculating a correlation between a spatial signature of said scheduled mobile station and a spatial signature of each other mobile station in said available set of mobile stations; and identifying as spatially correlated with said scheduled mobile station all mobile stations in said available set of mobile stations for which said calculated correlation exceeds a predetermined threshold value.

3. The base station of claim 1, wherein said SDMA scheduling controller is further capable, while said available set of mobile stations is not empty, of repeating steps (b) and (c).

4. The base station of claim 3, wherein said SDMA scheduling controller is further capable of scheduling downlink transmissions to said plurality of mobile stations for a second time-frequency slot by:
performing steps (a), (b) and (c) for said second time-frequency slot; and
while said available set of mobile stations is not empty, repeating steps (b) and (c) for said second time-frequency slot.

5. The base station of claim 4, wherein said SDMA scheduling controller is further capable of scheduling downlink transmissions to said plurality of mobile stations for each available time-frequency slot between said base station and said plurality of mobile stations by:
performing steps (a), (b) and (c) for each available time-frequency slot; and
while said available set of mobile stations is not empty, repeating steps (b) and (c) for each available time-frequency slot.

6. The base station of claim 5, wherein said SDMA scheduling controller is further capable of allocating power to each time-frequency slot according to a carrier-to-interference and noise ratio (CINR) parameter of said time-frequency slot.

7. The base station of claim 5, wherein said SDMA scheduling controller is further capable of calculating a beam-forming coefficient of said antenna array for each time-frequency slot according to one or more spatial signatures corresponding to one or more mobile stations scheduled for downlink transmission in said time-frequency slot.

8. A wireless network comprising a plurality of base stations, each one of said base stations capable of communicating with a plurality of mobile stations in a coverage area of said wireless network, said each base station comprising:
a transceiver capable of transmitting downlink orthogonal frequency division multiple access (OFDMA) signals to each of said plurality of mobile stations;
an antenna array comprising a plurality of antenna elements capable of transmitting said downlink OFDMA signals to said each of said plurality of mobile stations wing spatially directed hems; and
a spatial division multiple access (SDMA) scheduling controller capable of scheduling downlink transmissions to said plurality of mobile stations for a first time-frequency slot by:
(a) including in an available set of mobile stations all of said plurality of mobile stations;
(b) scheduling a mobile station having a highest priority in said available set of mobile stations for downlink transmission in said first time-frequency slot; and
(c) removing from said available set of mobile stations all mobile stations that are spatially correlated with said scheduled mobile station.

9. The wireless network of claim 8, wherein said SDMA scheduling controller is further capable of:
calculating a correlation between a spatial signature of said scheduled mobile station and a spatial signature of each other mobile station in said available set of mobile stations; and
identifying as spatially correlated with said scheduled mobile station all mobile stations in said available set of mobile stations for which said calculated correlation exceeds a predetermined threshold value.

10. The wireless network of claim 8, wherein said SDMA scheduling controller is further capable, while said available set of mobile stations is not empty, of repeating steps (b) and (c).

11. The wireless network of claim 10, wherein said SDMA scheduling controller is further capable of scheduling downlink transmissions to said plurality of mobile stations for a second time-frequency slot by:
performing steps (a), (b) and (c) for said second time-frequency slot; and
while said available set of mobile stations is not empty, repeating steps (b) and (c) for said second time-frequency slot.

12. The wireless network of claim 11, wherein said SDMA scheduling controller is further capable of scheduling downlink transmissions to said plurality of mobile stations for each available time-frequency slot between said base station and said plurality of mobile stations by:
performing steps (a), (b) and (c) for each available time-frequency slot; and
while said available set of mobile stations is not empty, repeating steps (b) and (c) for each available time-frequency slot.

13. The wireless network of claim 12, wherein said SDMA scheduling controller is further capable of allocating power to each time-frequency slot according to a carrier-to-interference and noise ratio (CINR) parameter of said time-frequency slot.

14. The wireless network of claim 12, wherein said SDMA scheduling controller is further capable of calculating a beam-forming coefficient of said antenna array for each time-frequency slot according to one or more spatial signatures corresponding to one or more mobile stations scheduled for downlink transmission in said time-frequency slot.

15. For use in wireless network capable of communicating with a plurality of mobile stations in a coverage area of the wireless network, a method of scheduling the transmission of downlink orthogonal frequency division multiple access (OFDMA) signals using spatially directed beams to each of the plurality of mobile stations, the method comprising:
scheduling downlink transmissions to the plurality of mobile stations for a first time-frequency slot by:
(a) including in an available set of mobile stations all of to plurality of mobile stations;
(b) scheduling a mobile station having a highest priority in to available set of mobile stations for downlink transmission in the first time-frequency slot; and
(c) removing from the available set of mobile stations all mobile stations that are spatially correlated wit the scheduled mobile station.

16. The method of claim 15, further comprising:
calculating a correlation between a spatial signature of the scheduled mobile station and a spatial signature of each other mobile station in the available set of mobile stations; and
identifying as spatially correlated with the scheduled mobile station all mobile stations in the available set of mobile stations for which the calculated correlation exceeds a predetermined threshold value.

17. The method of claim 15, further comprising, while the available set of mobile stations is not empty, repeating steps (b) and (c).

18. The method of claim 17, further comprising scheduling downlink transmissions to the plurality of mobile stations for a second time-frequency slot by:
- performing steps (a), (b) and (c) for the second time-frequency slot; and
- while the available set of mobile stations is not empty, repeating steps (b) and (c) for the second time-frequency slot.

19. The method of claim 18, further comprising scheduling downlink transmissions to the plurality of mobile stations for each available time-frequency slot between the base station and the plurality of mobile stations by:
- performing steps (a), (b) and (c) for the each available time-frequency slot; and
- while the available set of mobile stations is not empty, repeating steps (b) and (c) for each available time-frequency slot.

20. The method of claim 19, further comprising allocating power to each time-frequency slot according to a carrier-to-interference and noise ratio (CTNR) parameter of the time-frequency slot.

* * * * *

UNITED STATES PATENT AND TRADEMARK OFFICE
CERTIFICATE OF CORRECTION

PATENT NO. : 7,536,205 B2  Page 1 of 1
APPLICATION NO. : 11/128772
DATED : May 19, 2009
INVENTOR(S) : Cornelius Van Rensburg, Jiann-An Tsai and Lai King Tee It is certified that error appears in the above-identified patent and that said Letters Patent is hereby corrected as shown below:

Column 13, Claim 8, line 48, delete "wing" and replace with --using--;

Column 13, Claim 8, line 48, delete "hems" and replace with --beams--;

Column 14, Claim 15, line 49, delete "to" and replace with --the--;

Column 14, Claim 15, line 51, delete "to" and replace with --the--;

Column 14, Claim 15, line 54, delete "wit" and replace with --with--; and

Column 16, Claim 20, line 9, delete "(CTNR)" and replace with --(CINR)--.

Signed and Sealed this

Thirteenth Day of April, 2010

David J. Kappos
*Director of the United States Patent and Trademark Office*